US007008602B2

(12) United States Patent
Smith et al.

(10) Patent No.: US 7,008,602 B2
(45) Date of Patent: Mar. 7, 2006

(54) BENEFICIATION OF TITANIFEROUS ORE WITH SULFURIC ACID (75) Inventors: Earl Smith, Severna Park, MD (US); Michael Robinson, Burgh-on-Bain (GB); Kirit Talati, Grimsby (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 261 days.

(21) Appl. No.: 10/126,241

(22) Filed: Apr. 19, 2002

(65) Prior Publication Data
US 2003/0198591 A1 Oct. 23, 2003

(51) Int. Cl.
C01G 23/00 (2006.01)
(52) U.S. Cl. .................. 423/82; 423/610; 423/615; 423/616
(58) Field of Classification Search ................ 423/82, 423/610, 615, 616
See application file for complete search history.

(56) References Cited

U.S. PATENT DOCUMENTS

| | | | |
|---|---|---|---|
| 2,127,247 A | 8/1938 | Dawson et al. | |
| 2,488,439 A | 11/1949 | Heinrich et al. | |
| 2,488,440 A | 11/1949 | Heinrich et al. | |
| 2,559,638 A | 7/1951 | Krehma et al. | |
| 2,721,626 A | 10/1955 | Rick | |
| 2,833,627 A | 5/1958 | Krehma | |
| 2,899,278 A | 8/1959 | Lewis | |
| 2,965,476 A | 12/1960 | Röck et al. | |
| 3,252,787 A | 5/1966 | Shiah | |
| 3,446,590 A | 5/1969 | Michal et al. | |
| 3,597,189 A | 8/1971 | Sinha | |
| 3,647,414 A | 3/1972 | Nilsen | |
| 3,649,243 A | 3/1972 | Williams et al. | |
| 3,660,029 A | 5/1972 | Naguib | |
| 3,660,078 A | 5/1972 | Yamada et al. | |
| 3,734,996 A | 5/1973 | Bade et al. | |
| 3,764,651 A | 10/1973 | Henkel et al. | |
| 3,784,670 A | 1/1974 | Yamada et al. | |
| 3,825,419 A | 7/1974 | Chen | |
| 3,875,286 A | 4/1975 | Robinson et al. | |
| 3,877,929 A | 4/1975 | Whitehead et al. | |
| 3,897,537 A | 7/1975 | Robinson et al. | |
| 3,922,164 A | 11/1975 | Reid et al. | |
| 4,019,898 A | 4/1977 | Chen et al. | |
| 4,038,363 A | 7/1977 | Jarish | |
| 4,089,675 A | 5/1978 | Preston et al. | |
| 4,097,574 A | 6/1978 | Auger et al. | |
| 4,120,694 A | 10/1978 | Elger et al. | |
| 4,163,047 A | 7/1979 | Dörr et al. | |
| 4,199,552 A | 4/1980 | Rado | |
| 4,272,343 A | 6/1981 | Brunsell et al. | |
| 4,288,418 A * | 9/1981 | Davis et al. ............ | 423/83 |
| 4,321,236 A | 3/1982 | Stambaugh et al. | |
| 4,562,048 A | 12/1985 | Moles et al. | |
| 4,784,841 A | 11/1988 | Hartmann et al. | |
| 4,988,495 A | 1/1991 | Wiederhöft et al. | |
| 5,181,956 A | 1/1993 | Chao | |
| 5,266,108 A | 11/1993 | Hauck | |
| 5,427,749 A | 6/1995 | Hollitt et al. | |
| 5,489,423 A | 2/1996 | Mikani et al. | |
| 5,578,109 A | 11/1996 | Harris et al. | |
| 5,601,630 A | 2/1997 | Hoecker | |
| 5,826,162 A | 10/1998 | Aral et al. | |
| 5,885,324 A | 3/1999 | Balderson et al. | |
| 5,910,621 A | 6/1999 | Harris et al. | |
| 6,090,354 A * | 7/2000 | Russell et al. .......... | 423/82 |
| 6,471,743 B1 | 10/2002 | Young et al. | |

FOREIGN PATENT DOCUMENTS

| | | |
|---|---|---|
| AU | 56550/60 | 1/1963 |
| DE | 2234843 | 1/1974 |
| DE | 3635010 | 4/1988 |
| EP | 0 243 725 | 11/1987 |
| GB | 980864 | 1/1965 |
| GB | 1026691 | 4/1966 |
| GB | 1217592 | 12/1970 |
| GB | 1225826 | 3/1971 |
| GB | 1243798 | 8/1971 |
| GB | 1262401 | 2/1972 |
| GB | 1282324 | 7/1972 |
| GB | 1282504 | 7/1972 |
| GB | 1282505 | 7/1972 |
| GB | 1282507 | 7/1972 |
| GB | 1293230 | 10/1972 |
| GB | 1300973 | 12/1972 |
| GB | 1392441 | 4/1975 |
| GB | 1431551 | 4/1976 |
| GB | 1431552 | 4/1976 |
| WO | WO 93/18191 | 9/1993 |
| WO | WO 93/18192 | 9/1993 |

(Continued)

OTHER PUBLICATIONS

Translation of Japan 03-183621, Aug. 9, 1991.*

(Continued)

Primary Examiner—Steven Bos
(74) Attorney, Agent, or Firm—Kalow & Springut LLP; Kevin M. Carroll (57) ABSTRACT Processes for the efficient and economical beneficiation of titaniferous ore are provided. A unique process for beneficiating ore comprising pretreatment of the ore by oxidation and reduction, followed by acid leaching with sulfuric acid has been developed. The acid used in this process may be recycled, which will thereby increase the efficiency of the process. Preferably the ore treated according to the present invention is ilmenite ore.

16 Claims, 4 Drawing Sheets

FOREIGN PATENT DOCUMENTS

WO      WO 94/12675      9/1994

OTHER PUBLICATIONS

Translation of DE 2,234,843, Jan. 1974.*
Abstract of ZA 7005321, Jul. 1970.
PCT International Search Report, European Patent Office, Oct. 3, 2003.
Abstract of R0114959, Sep. 1999.
Abstract of AU 62420/90, Mar. 1991.

* cited by examiner

BENEFICIATION OF TITANIFEROUS ORE WITH SULFURIC ACID

BACKGROUND OF THE INVENTION

The present invention relates to the beneficiation of ore. More particularly, the present invention relates to the beneficiation of titaniferous ores that contain iron through leaching.

Naturally occurring titanium ores are the raw materials for many commercial products. For example, naturally occurring rutile titanium dioxide ore is a raw material for pigment for paper, coatings, and plastics products. Unfortunately, this type of ore is scarce and expensive to use as a feedstock.

Ilmenite ore is another type of naturally occurring ore. It is an attractive alternative to naturally occurring rutile titanium ores because it is both cheaper to mine and more common. Unfortunately, ilmenite and many other naturally occurring ores often contain unacceptable levels of certain impurities that render them undesirable for use in industrial processes without some degree of purification. In the case of ilmenite, the ore contains mostly unacceptable levels of iron.

A number of processes have been suggested for removing impurities from ores such as ilmenite and making them more suitable for industrial applications. For example, slagging, partial chlorination, and the Becher process are currently being used to beneficiate ilmenite ore.

One may also upgrade ilmenite by removing its iron oxide content, as well as many other impurities through acid leaching. Examples of such acid leaching processes are the Benilite process and the Ishihara process. Both of these processes are well known to persons skilled in the art. Commercially, the upgraded $TiO_2$ feedstock material produced through leaching processes is referred to as "synthetic rutile."

Acid leaching of titanium oxides is a well known method for purification. However, conventional acid leaching has two shortcomings. First, often it is desirable to remove a greater percentage of the impurities than is practical under current technologies without increasing other parameters such as leach intensity and retention time, which increase both capital and variable costs. Second, acid leaching often generates a large amount of acid waste.

In order to develop acid leaching processes that yield sufficiently pure $TiO_2$ products, many persons have used pretreatment steps in connection with complex leaching methods that require both multiple Teachings and magnetic separation of the partially leached ore from the ore particles that have been completely leached. The phrase "leached ore" refers to ore that has had one or more constituents removed through the use of a leaching agent. Further, in some cases it is necessary to include a seeding step in order to facilitate leaching of the ore. These steps all have costs associated with them that become significant when they are performed on an industrial scale. For example, one needs to obtain a sufficient amount of the leaching agent. Additionally, even using these added steps, it is often difficult to generate a sufficiently pure titanium dioxide product economically.

Moreover, any process for acid leaching will need to address the handling of acid waste by-products. Most current technology calls for either the neutralization and disposal of waste solids from such processes or for a high temperature roasting process, which produces metallic oxides and acid. Both of these types of processes render current acid leaching techniques to be of limited economic attractiveness.

Most known acid leaching of ores that contain titanium oxides has focused on the use of hydrochloric acid. However, for both of the aforementioned reasons—the costs for developing a sufficiently pure product and the disposal of waste being too high—processes using hydrochloric acid have been less than ideal for acid leaching. Thus, it is necessary to explore leaching techniques that use other acids, as well as to develop ways to increase the efficiency of the overall process.

Sulfuric acid has been tried as an alternative, but to date has not been viewed as a success, in part because many prior attempts have not generated high enough yields of sufficiently pure titanium oxides, and have generated large amounts of waste. In fact, absent a pretreatment step, sulfuric acid leaching of ilmenite results in a product that differs only marginally from the starting ilmenite in terms of $TiO_2$ and iron oxide content. Further, in those processes that have suggested pretreatment steps, the steps have not been optimized in order to generate a product that is easy to process during leaching. Instead, the prior attempts have required the additional aforementioned use of costly magnetic separation and/or seeding steps.

For the above reasons, the development of a cost-effective beneficiation process that reduces waste is needed. The present invention provides both an efficient means to beneficiate certain ores through a sulfuric acid leaching process, as well as to increase the efficiencies of these processes by separating and recycling this acid from what have traditionally been viewed as waste water streams.

SUMMARY OF THE INVENTION

The present invention provides new methods for the beneficiation of ores and decreasing the costs for making these beneficiated ores. Under these methods, titaniferous ores that contain iron may be pretreated and then subjected to sulfuric acid leaching. This process is found to improve product quality and yield of the titanium dioxide products and to reduce processing costs, while also providing significant improvements to downstream processing properties, i.e., minimization of byproduct fines and filterability of those fines. The present invention also provides a novel method for separating and recycling leaching agents such as sulfuric acid through crystallization. This recycle process may be used in combination with the above-mentioned pretreatment and leaching process or it may be used independently.

In one embodiment, titaniferous ore that contains iron, for example, ilmenite, is pretreated so that substantially all of the iron has a valence of 2. This iron is referred to as ferrous iron. Because of the pretreatment step, the resulting pretreated ore may be combined with a single stage low temperature sulfuric acid leaching process.

In this embodiment, the present invention provides a method for recovery of a $TiO_2$ product that comprises the steps of:

a. leaching a pretreated titaniferous ore with sulfuric acid to form a liquid phase and an undissolved titanium oxide phase, wherein said pretreated titaniferous ore is comprised of iron and substantially all of the iron is ferrous iron, and wherein said liquid phase is comprised of fines; and b. separating a $TiO_2$ product from said undissolved titanium oxide phase.

According to this embodiment, pretreatment is accomplished in two steps. First, there is oxidation of a titaniferous ore that contains iron to form a material containing ferric pseudobrookite and rutile. Second, that material is reduced to form a pretreated ore in which substantially all of the iron is ferrous iron.

Under a second embodiment, the present invention provides a method for recovery of a $TiO_2$ product from the liquid phase generated during the leaching of pretreated titaniferous ore that contains iron. This method comprises the steps of:

a. leaching a pretreated titaniferous ore with sulfuric acid to form a liquid phase and an undissolved titanium oxide phase, wherein said pretreated titaniferous ore is comprised of iron and substantially all of the iron is ferrous iron, and wherein said liquid phase is comprised of fines; and b. separating a $TiO_2$ product from said fines.

The aforementioned first and second embodiments may be used independently or in combination with each other.

Under a third embodiment, the present invention provides a method for separating a leaching agent via crystallization. This acid may be recycled and used in a subsequent leaching process. This method comprises the steps of:

a. treating a titaniferous ore with a leaching agent to form a liquid phase and a coarse particle phase, wherein said liquid phase comprises dissolved iron salts;

b. separating the liquid phase from the coarse particle phase;

c. crystallizing and removing said dissolved iron salts from said liquid phase to yield a residual acid; and d. recycling said residual acid as said leaching agent.

Under a preferred sub-embodiment, the oxidation, reduction and leaching stages may be combined with the recycling of the leaching agent, and the leaching agent may be used to leach additional ore. Under an additional sub-embodiment that may be used in combination with or independent of the previously mentioned sub-embodiment, fines may be separated prior to crystallization of the dissolved iron salts.

By combining the pretreatment and leaching steps, the present invention provides considerable and surprising advantages over the prior art, including: (1) high purity synthetic rutile generated from low temperature sulfuric acid leaches; (2) the ability to generate a high purity synthetic rutile from a low temperature single stage leach without the use of magnetic separation and recycle of off spec material; (3) high yield of feedstock $TiO_2$ as useable product; (4) reduced process energy consumption; (5) simplified operational processes; and (6) reduced capital costs.

Further, by recycling acid via crystallization, the present invention also significantly alters the economics of sulfuric acid based synthetic rutile processes, rendering them both more efficient and more economical for a number of reasons, including: (1) sulfuric acid feedstock costs are significantly reduced; (2) plant synthetic rutile throughputs are significantly increased for facilities using waste acid; (3) waste neutralization costs are significantly reduced; (4) crystalline iron sulfate is generated as a co-product for possible sale; and (5) energy requirements for crystallization are relatively low.

The invention also demonstrates an exceptional ability to leach manganese, another impurity that may be found in titaniferous ores.

DETAILED DESCRIPTION OF THE INVENTION

The present invention provides methods for processing titaniferous ores that contain iron through the use of a pretreatment and a sulfuric acid leaching process. The present invention also provides processes for recycling leaching agents such as sulfuric acid through crystallization. These recycling processes may be used alone or in combination with the aforementioned pretreatment and leaching processes.

The present disclosure is not intended to be a treatise on the beneficiation of $TiO_2$ or the treatment of acid waste water. Readers are referred to appropriate, available texts and other materials in the field for additional and more detailed information on these subjects.

Acid leaching typically has five basic steps. First, there is a pretreatment step. During this step, one begins with the titanium oxide ore, 1, an example of which is ilmenite ore, and subjects it to pretreatment by the addition of chemicals and heat, 2. Pretreatment may involve oxidation and/or reduction of the naturally occurring ore to produce a pretreated ore, 4, as well as what are known as off gases (e.g., $CO$, $CO_2$, $H_2O$, $SO_2$,) as by-products, 3. The purpose of the pretreatment step is to facilitate leaching. Traditionally, when the starting ore has been ilmenite and pretreatment involved reduction, there was a chemical reduction of some portion of the ferric iron in the ore to the ferrous form and in many cases to the metallic state. Reduction is desirable because both metallic iron and ferrous oxide leach much more readily than ferric oxide. Reductants can vary widely, and their use is well known to persons skilled in the art; hydrogen, oil, coal, and coke are common choices. Use of a solid phase reductant is generally followed by a sieving and/or a magnetic separation step (not shown in FIG. 1) wherein unreacted reductant, or char, is separated from the reduced ore and recycled to the input to the reduction step. In some pretreatment processes, an oxidation step is also present in conjunction with reduction.

Figure 1:
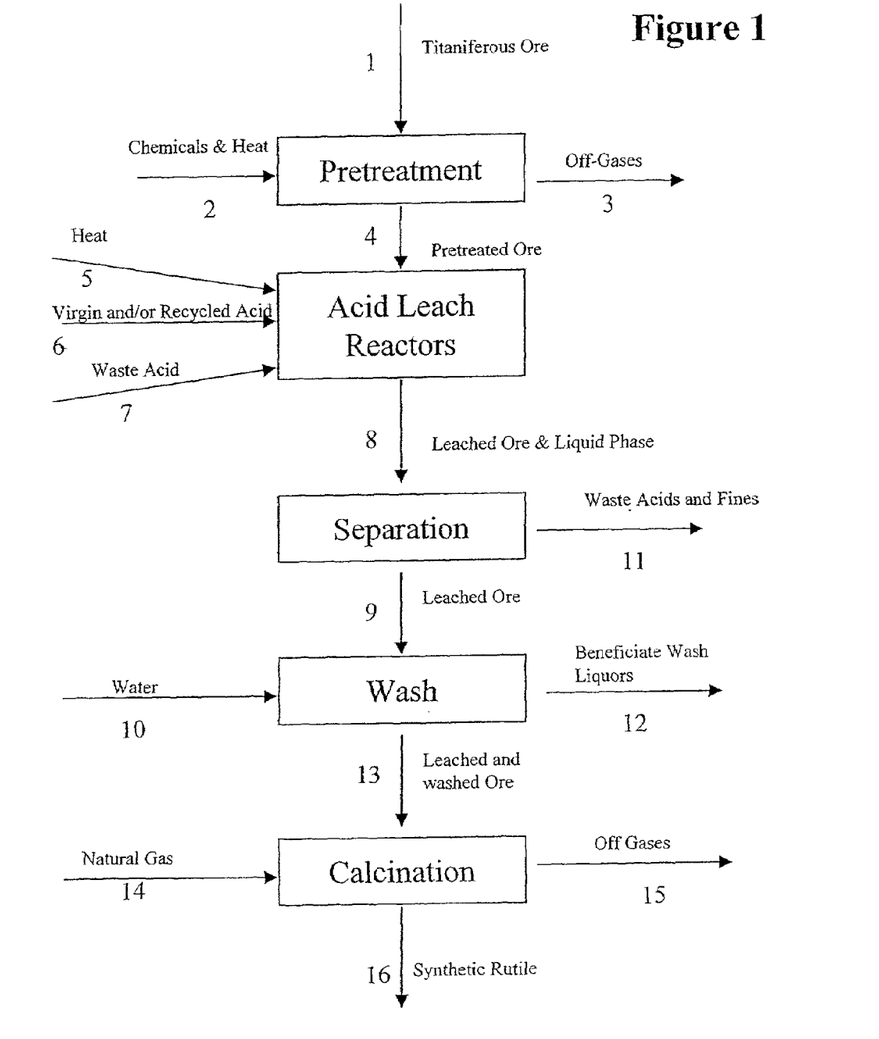
FIG. 1 is a representation of known acid leaching processes for ores that contain titanium oxides.

Second, there is a leaching step. During this step, the pretreated ore, 4, is leached with an acid that may be virgin and/or recycled acid, 6, and heat, which is typically added as steam, 5, to remove iron and other impurities. The acid of choice has often been hydrochloric acid, but other mineral acids, such as sulfuric acid, could serve the purpose, if one could appropriately adjust other parameters in order to permit effective and efficient leaching. Further, one may add waste acids, for example, steel pickling acids at this time as well, 7. The product of this step contains a leached ore phase and a liquid phase, that contains both fines, and waste acids, 8.

Third, the leached ore phase and liquid phase, 8, are subject to a separation step. During this process, one separates the waste acid and fines, 11, which are typically sent to waste treatment, from the leached ore phase, interstitial fluids and a small amount of fines, 9. The interstitial fluid and small amount of fines that are associated with the leached ore at this stage are not shown in FIG. 1

Fourth, the leached ore phase, 9, is then washed with dilute waste acid generally followed by water, 10, to generate leached and washed ore, 13, and the beneficiate wash liquors, 12, which contain interstitial fluids and fines that were not previously separated.

Fifth, there is calcination. During this stage, the leached and washed ore, 13, is calcined to remove both free and chemically bound moisture from the ore by, for example, subjecting the leached and washed ore to combusted natural gas, 14. Residual salts and acid that still remain associated with the ore particles are broken down to form decomposition gases and metallic oxides. These gaseous components, also known as off-gases are removed, 15. The metallic oxides, including titanium dioxide, remain in the ore based solids and may be used in industrial processes as synthetic rutile, 16.

The present invention improves the aforementioned basic process. According to the first embodiment of the present invention, one begins with an ore that contains oxides of both titanium and iron. The phrase "titaniferous ore" refers to any ore that contains titanium. Other substances may also be found in titaniferous ore. These substances may include, but are not limited to, substances that contain Fe, Si, Zr, Al, Cr, V, Nb, Ca, Mn and Mg. The components of the ore are typically in their oxide or hydrated oxide forms.

Preferably, the titaniferous ore is ilmenite ore, but the titaniferous ore that may be used according to the present invention may be any ore that contains both titanium oxides and iron that from reading this disclosure, one skilled in the art determines would benefit from the use of the methods of the present invention. If the titaniferous ore is ilmenite, then it preferably contains titanium in a concentration (dioxide equivalent basis) between about 40 wt. % and about 65 wt. % and particles that are of a size range that is suitable for use in a fluid bed chlorinator.

When one applies the present invention to the processing of ilmenite, one may begin with an ilmenite ore that has been weathered to a large or small degree or not weathered at all. Less weathered ilmenite is typically found as massive rock deposits in the form of a part of igneous rocks and contains more ferrous iron than ferric iron compared to weathered ilmenites. Less weathered ilmenite also contains a lower proportion of titanium oxide than more weathered ilmenite contains. More weathered ilmenite is, by contrast, more typical of beach sands and has undergone various degrees of natural weathering, which washes away some of the iron. The more weathered ilmenites contain more ferric iron than ferrous iron. The present invention pretreatment process is useful for both more and less weathered ilmenite, but it is particularly useful for less weathered ilmenites.

According to this embodiment, the titaniferous ore is pretreated so as either to destroy the crystal lattice structure of the naturally occurring ore or to increase the imperfections in that crystal lattice structure. The phrase "pretreated ore" refers to a titaniferous ore that has had the crystal lattice structure changed in this manner.

In a preferred embodiment, pretreatment involves oxidation and reduction of a titaniferous ore that contains iron. The titaniferous ore that has been oxidized may be referred to as "oxidized ore." In the case of ilmenite, there is a transformation of the ilmenite to separate phases of pseudobrookite and rutile, which may be represented by the formulas $Fe_2O_3 \cdot TiO_2$ and $TiO_2$, respectively. Preferably, substantially all of the ferrous iron will be oxidized to ferric iron. More preferably, all of the ferrous iron will be oxidized to ferric iron.

Under this embodiment, oxidation destroys the natural ilmenite crystalline structure or at least increases the imperfections in the ilmenite crystalline structure, which in turn will facilitate the subsequent processing of the ore. This change of the ilmenite structure during oxidation may be verified by x-ray diffraction. Preferably, there is sufficient oxidation such that no ferrous iron, as indicated by ilmenite content, can be detected by x-ray diffraction. According to the present invention, the destruction of the ilmenite structure is best accomplished by high temperature oxidation. The methods for oxidizing ore are well known to persons skilled in the art. Preferably, the temperature range for oxidation is from about 800° C. to about 1150° C. and more preferably from about 900° C. to about 1000° C. The duration of oxidation will be dependent on the temperature at which oxidation takes place and the equipment used. This time period will be readily determined by one skilled in the art. At higher temperatures, there is a tradeoff between reaction times and the possible sintering of the product. Thus, measurably higher temperatures are less desirable.

For some of the more weathered ilmenites that are already highly oxidized, it is possible that a less efficient form of the process can be carried out as a high temperature roast at slightly oxidizing to essentially neutral conditions (e.g., a roast can occur using nitrogen or natural gas combusted at near stoichiometric conditions). However, this option may not achieve the total destruction of the ilmenite and will likely result in a less effective leach process after the roasted material has been reduced. Hence, high temperature oxidation is considered the most effective route and is preferred, particularly since weathered ilmenites are in short supply. Oxidation is also preferably carried out at atmospheric pressure. Examples of oxidation systems that may be useful according to the present invention include, but are not limited to, a fluid bed or a rotary kiln.

According to this embodiment, following oxidation there will be reduction. When the starting ore is ilmenite the product of the reduction of the oxidized ore is ilmenite that contains residual rutile. Thus, although as in the case of ilmenite, the starting ore and the pretreated ore are both ilmenite, the pretreated ore exists in a state whereby the iron will be more reactive during the subsequent leaching. Without wishing to be bound by any particular theory, it is believed that this is due to greater accessibility of the iron to the acid because of increased porosity, micro-fissures, etc., as well as removal of substantially all of the ferric iron, which is less reactive than the ferrous iron.

The oxidized ore that has been reduced is referred to as "oxidized and reduced ore," which is an example of a "pretreated ore." Because this pretreated ore has been obtained from a titaniferous ore that contains substances that contain iron, these substances may be referred to as "iron-containing substances."

Preferably, the reduction is carried out under conditions so that substantially all of the iron is ferrous iron, i.e., one wants to maximize the conversion of $Fe^{+3}$ species to $Fe^{+2}$, while minimizing the conversion to metallic iron. Although in many applications, ideally in the pretreated ore all of the iron will be ferrous iron, in practice, this is difficult to ensure. As one converts all of the ferric iron into ferrous iron, a very small amount of the ferrous iron will be converted into metallic iron. Thus, in practice, preferably, there will be less than 1.0 wt. % metallic iron, and there will also be effectively 0 wt. % $Fe^{+3}$ based on the weight of the iron-containing substances. Minimization of $Fe^{+3}$ is important, because $Fe^{+3}$ is relatively insoluble in sulfuric acid, and $Fe^{+3}$ solubility is closer to that of $TiO_2$. Minimization of metallic iron is also important. Reduction to the metallic state for iron causes a weakening of the particle structure that results in particle attrition in fluid bed chlorinators.

However, the presence of a trace amount of metallic iron will provide certain benefits to the leaching process described below. Therefore, preferably one produces trace amounts of the metallic iron.

The preferred temperature range for reduction is between about 800° C. and about 1000° C. As was discussed above in connection with oxidation, there is a tradeoff at high temperatures between reaction times and the possible sintering of the product. Thus, significantly higher temperatures should be avoided. Further, too rapid a reduction should also be avoided because it, like the presence of metallic iron, causes particle attrition when the synthetic rutile is used for fluid bed chlorination.

There are a number of additional tradeoffs to achieve the optimal reduction. A high temperature reduction of short duration can result in a particle where reduction has occurred on the surface but not throughout the entire particle. A reduction that has been carried out for too long can result in an annealing or reforming of the particle structure that forms macroscopic pores as opposed to the more desirable microscopic pores. Macroscopic pores tend to result in higher attrition rates in fluid bed chlorinators.

Reduction is most preferably carried out in two stages: (i) at 850° C. initially; and (ii) at a brief final temperature of between 900° C. to 950° C. for the final stage of reduction, which may be obtained by a rapid climb in temperature. Rapid cooling of the material after reduction is helpful to preserve imperfections in crystal structure that increase the reactivity of the material. Preferably, all reduction occurs at approximately atmospheric pressure. Preferred reducing agents include anthracite or non-caking coal, but other reducing agents are suitable, e.g., hydrogen, CO, lignite, and green coke. Further, cooling after reduction should be carried out in a non-oxidizing environment, such as nitrogen gas or kiln off-gas. If the environment is not non-oxidizing, the material may be re-oxidized. It should be noted that lower temperatures for reduction are possible when certain reducing agents are used, but typically, they are not economically feasible.

Following reduction there will preferably be a sieving and/or a magnetic separation step in order to separate the unreacted reductant, or char, particles from the reduced ore particles. The use of magnetic separation to separate solid particles is well known to persons skilled in the art. The unreacted char is typically recycled to the beginning of the reduction step.

One surprising development in the aforementioned process is that there is a greatly reduced level of manganese in the final coarse beneficiate when one compares oxidized materials to unoxidized materials. Although not wishing to be bound to any one theory, it may be speculated that the manganese exhibits leaching behavior similar to that of iron when subjected to oxidation and reduction.

The pretreated ore is subsequently leached with sulfuric acid. As described above, the pretreated ore will preferably have been through a magnetic separation step prior to leaching. The methods for leaching are well known to persons skilled in the art. According to the present invention, the pretreated ore and the sulfuric acid are combined to form a slurry in which the acid separates the ferrous iron species from the titanium oxides so as to produce a leached ore phase and a liquid phase. The term "slurry" means any combination of pretreated ore or leached ore and acid, including but not limited to a solution, suspension or other mixture. The phrases "leached ore phase" and "coarse particle phase" as used herein refer to the phase that is comprised of the titanium oxides that have not dissolved in the acid. These titanium oxides may be referred to as "undissolved $TiO_2$ particles."

The "liquid phase" comprises the substances that have dissolved, as well as those that have been reformed and are suspended in the liquid. They are usually acid, salts and fine particles. The fine particles will be comprised of both those particles that were formed from in-situ precipitation or crystallization of salts, as well as attrited particles from the undissolved leached ore. Within the liquid phase will be "leached ferrous iron," which refers to the ferrous iron that has been separated from the titanium oxide. Typically, the liquid phase will be high in sulfuric acid and iron sulfate, while being relatively low in concentrations of other dissolved salts. Examples of these salts include, but are not limited to $MgSO_4$, $MnSO_4$, $VO(SO_4)$, $Zr(SO_4)_2$ and $Al_2(SO_4)_3$. The phrase "fine particles" and the term "fines" as used herein refer to particles of hydrated titanium oxides, crystallized ferrous sulfate and other particles obtained from material that originally dissolved and subsequently precipitated or crystallized in the liquid phase and are suspended in the liquid phase. The ferrous sulfate that is within the liquid phase is an example of the leached ferrous iron. Some of the titanium that is within the liquid phase may be in a hydrolyzed form; this titanium may nominally be in the form of $TiO_2$ or $TiO(OH)_2$. The ferrous sulfate that has crystallized out in the liquid phase may, for example, be in the form of hydrates, for example $FeSO_4.7H_2O$, $FeSO_4.4H_2O$, and $FeSO_4.H_2O$.

Preferably the sulfuric acid is present at concentrations in the range between about 5% and about 50% and more preferably between about 15% and about 35%. Leaching temperatures can be determined by those skilled in the art. Preferably, leaching occurs at temperatures in the range of from about 110° C. to about 200° C. and most preferably, from about 130° C. to about 160° C. Further, the leaching will preferably occur at a pressure between about 5 psig and about 150 psig. The sulfuric acid may be from a waste stream, such as a sulfate plant or steel pickling process, or of virgin quality, or a combination of waste stream and virgin quality acid.

The liquid phase may be separated from the leached ore phase via any method that is now known or that comes to be known and that from reading this disclosure it becomes apparent to one skilled in the art will be useful in connection with the present invention. The terms "separation," "separate," and "separating" refer to the recovery of one substance that is associated with another substance, such as in a slurry, mixture or solution, regardless of whether the separation is by physical and/or chemical means. The separation methods that may be used in the current invention include, but are not limited to, decantation, wet screening, centrifugation and the use of hydrocyclones. Further, because of the pretreatment, one should be able to produce a $TiO_2$ product from which a sufficient amount of iron and other impurities have been removed so that only one leaching step is necessary. Also, no seeding should be required. However, the process of the present invention does not pose any impediment to multiple leaching steps, seedings or the use of magnetic separation after Teachings, should they be desired.

Following separation, the leached ore is then washed to remove dissolved salts and residual fines. Preferably, the leached ore is processed through at least one agitated wash and decantation, possibly followed by belt filtration. Methods for washing are well known to persons skilled in the art, and washing may be accomplished with any substance that from reading this disclosure, it becomes apparent is effective at separating the leached ore from residual salts and fines. For example, washing may be accomplished by the use of water and countercurrent washing methods that use weak acids. Both of these washing techniques are well known to persons skilled in the art.

The leached and washed ore particles, which are $TiO_2$ products, may then be used as feedstock or further processed. The phrase "$TiO_2$ product" refers to a titanium moiety that has been isolated from a titaniferous ore after some degree of beneficiation and may be used either directly in a commercial application or further processed for subsequent use in a commercial application. Thus, the titanium oxide that has been isolated from the slurry is a $TiO_2$ product. Ilmenite ores, when pretreated via the above process are easily upgraded to a concentration of 80% $TiO_2$ and even as high as 97%. Higher percentages may be possible by variations of acid and ore ratios, as well as temperatures and pressures at leaching. However, the economics of these processes may render them not feasible. The titanium may also be calcined to produce a "calcined $TiO_2$ product."

The $TiO_2$ products may be used in many applications. These applications include but are not limited to being used as a chlorinator feedstock, further processed and used as a pigment and used as a catalyst.

Figure 4:
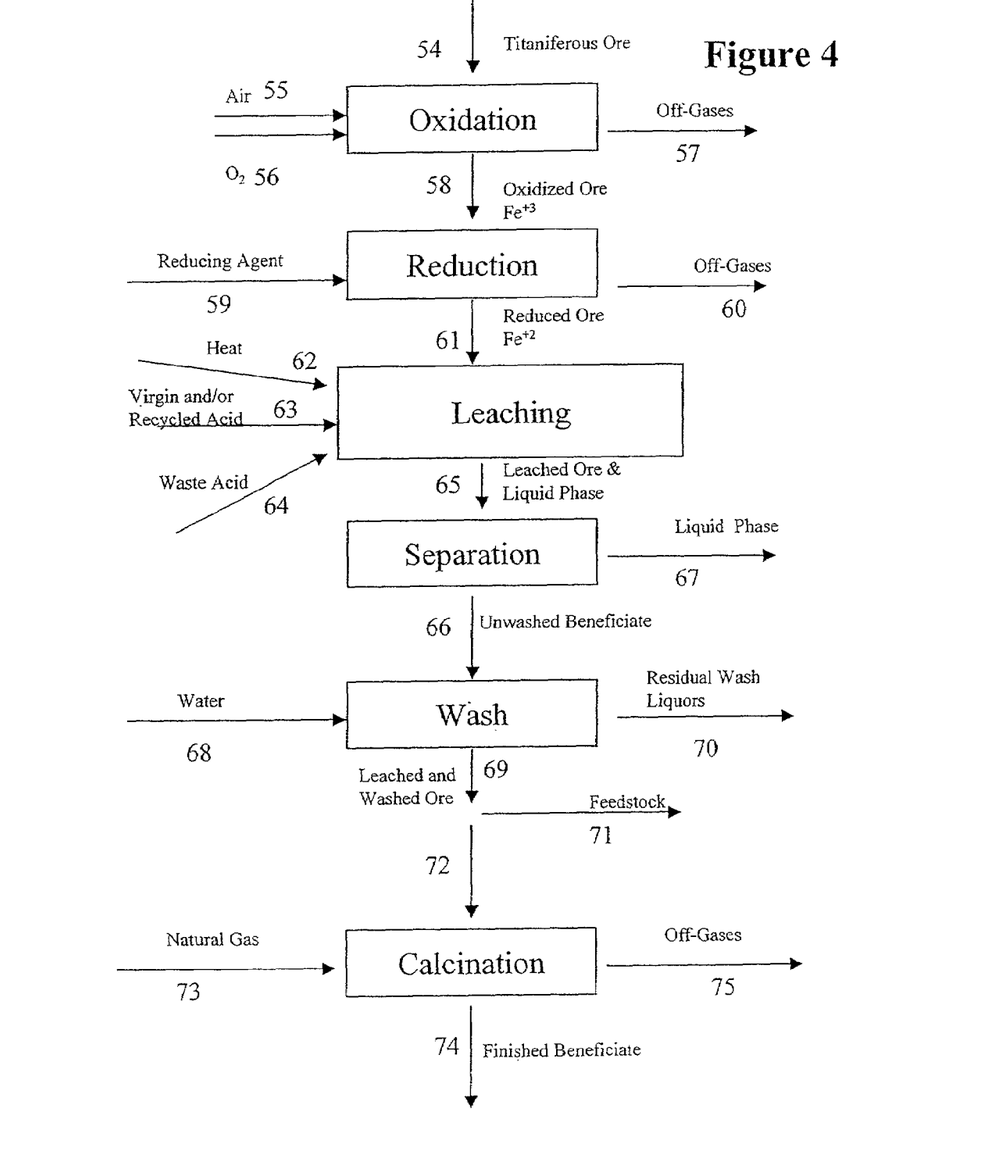
FIG. 4 is a representation of a beneficiation of a titaniferous ore through oxidation, reduction, leaching, separation, washing, and calcination.

FIG. 4 is a representation of the oxidation, reduction and leaching of a titaniferous ore. As described in the figure, a titaniferous ore, 54, is oxidized in the presence of air, 55, and in some cases, supplemental $O_2$, 56. Gases, also known as off-gases, are produced, 57, as well as an oxidized ore that contains ferric iron, 58. This oxidized ore is subsequently reduced in the presence of a reducing agent, 59, and cooled in a non-oxidizing atmosphere. The reduction will generate gases, 60, and a reduced ore in which substantially all of the iron is ferrous iron, 61.

This reduced ore, which is an oxidized and reduced ore, is then subjected to a leaching process in the presence of heat, which will typically be in the form of steam, 62, and acid that may be either virgin or recycled, 63. Waste acid such as sulfate waste acid may also be added, 64. The product of the leaching will be a leached ore phase and a liquid phase, 65.

The leached ore phase and liquid phase are separated from each other, generating an unwashed beneficiate, 66, and a liquid phase, 67. The unwashed beneficiate may then be washed by the addition of water, 68. This generates a leached and washed ore, 69, as well as the residual wash liquor, 70. The leached and washed ore, which is a $TiO_2$ product may be used as a feedstock, 71, or subject to calcination, 72, which preferably occurs at a temperature between about 600° C. and about 900° C., in the presence of heat, which may for example be in the form of combusted natural gas, 73. Calcination will produce a calcined $TiO_2$ product, which also may be referred to as a finished beneficiate or commercially as a synthetic rutile, 74, and emit gaseous by-products or off-gases, 75. The temperature at which the discharge from the leach occurs can vary according to downstream equipment constraints and should preferably be above the crystallization point of the septahydrate form of iron sulfate. This will deter the iron sulfate from crystallizing on the leached $TiO_2$ particles. Further, crystallization of the iron sulfate or of the solution is facilitated for vacuum crystallization when the mother liquor is hot.

Under a second embodiment, the pretreatment and leaching steps described above are followed, but the $TiO_2$ products are obtained from the liquid phase. By separating the fine particles from the liquid phase, also known as the mother liquor, one may recover titanium oxide products that may be used in various pigmentary processes. When the fines are initially separated, they may be in the form of a cake and thus referred to as a "fines cake." These fine $TiO_2$ particles may for example, be recovered as either hydrolysate for catalysis or sulfate plant use or calcined to produce a low grade pigment. Methods for separating fine particles suspended in a liquid are well known to persons skilled in the art. Any of these known methods or methods that come to be known and that from reading this disclosure it becomes apparent would be useful in connection with the present invention may be used. Examples of these methods include, but are not limited to, flocculation, centrifugation and filtration. Following the recovery of the titanium dioxide from the fines, preferably the fines will be washed to remove the residual salts and other undesirable substances.

During removal of the fines from the liquid phase, which is preferably accomplished by filtration, the fine $TiO_2$ particles may be precipitated with crystallized iron sulfate. These fine $TiO_2$ particles that have been precipitated with iron sulfate and removed from the mother liquor, must then be separated from the iron sulfate. To accomplish this, the fines are suspended in water or dilute acid to dissolve out the iron sulfate salts. Preferably, this will be accomplished by re-slurrying the fines and dissolving the iron sulfate salts in a dilute acid. Following re-slurrying there will be recovery of the $TiO_2$ particles, preferably by filtration. The recovered titanium oxide fines are washed after filtration. These fines may be used as a potential feedstock for a pigment process or a catalysis process. Examples of acids useful in connection with this step of the present invention include but are not limited to a 1% to 5% solution of sulfuric acid. Other options for washing include for example, using dilute HCl or phosphoric acid. Sulfuric acid is the preferred acid, because it is relatively inexpensive and can be recycled to crystallization.

The recovery of a $TiO_2$ product from the undissolved $TiO_2$ may be used in combination with the recovery of a $TiO_2$ product from the liquid phase. When these methods are used in combination, the $TiO_2$ product that is recovered from the undissolved $TiO_2$ may be referred to as a "first $TiO_2$ product" and the $TiO_2$ that is recovered from the liquid phase may be referred to as a "second $TiO_2$ product." However, the use of the terms "first" and "second" is not meant to suggest that one product should be obtained before the other. The first $TiO_2$ product and the second $TiO_2$ product may be calcined together to form a synthetic rutile product.

According to a third embodiment of the present invention, leaching agents may be used to treat titaniferous ores and recycled in order to increase the efficiency of obtaining $TiO_2$ products from titaniferous ores that contain iron. These titaniferous ores are preferably pretreated. A "leaching agent" is a substance that takes one substance such as iron out of the pores of a second substance such as titanium dioxide and leaves behind that second substance. As described above, with respect to titaniferous ores that contain iron, when sulfuric acid is used as a leaching agent, the iron is removed from the titanium dioxide, and a significant part of the titanium dioxide remains undissolved by the leaching agent. The term "treat" as used herein means to separate the iron from the titanium in the titaniferous ore.

The undissolved particles that are obtained when one uses a leaching agent may be referred to as the "coarse particles."

The liquid phase will comprise iron containing particles and preferably the precipitated and attrited titanium containing particles. As described above, both of these types of particles may be referred to as fines. In addition to containing fines, the liquid phase will also contain dissolved salts of iron, which are referred to as "dissolved iron salts," as well as a relatively small amount of titanium salts. Both the iron containing particles that are fines, as well as the dissolved iron salts are iron sulfate species. Collectively, the fines that contain iron and the dissolved iron salts are referred to herein as "the iron sulfate contained in the liquid phase." Collectively, the fines that contain titanium and the dissolved titanium salts are referred to herein as "the titanium contained in the liquid phase."

The waste from leaching may be recovered and recycled for use in subsequent Teachings. Preferably, the leaching agent will be sulfuric acid, but any substance that one skilled in the art determines is appropriate for separating iron from the titanium may be used. In the simplest process, the dissolved salts are crystallized in the presence of the fines and then separated from the acid, which is recycled. In this method, when the fines have not been removed before crystallization, they act as potential "seeds" for iron sulfate crystallization. The use of seeds is well known to persons skilled in the art.

In one preferred sub-embodiment, acid that is either virgin or recycled may be used to treat a first titaniferous ore that contains iron. The coarse particles may, for example, be removed, and the acid may then be recovered through separation of the acid from the fines particles and subsequent crystallization and separation of the acid from the iron salts. This acid may subsequently be recycled to treat a second titaniferous ore that contains iron. The phrase "first titaniferous ore" is used to refer to an ore that is treated with acid then subsequently converted into a $TiO_2$ product. The phrase "second titaniferous ore" is used herein to refer to a titaniferous ore that is being leached after the first titaniferous ore has been leached and that is leached with acid that has been recovered from the leaching of the first titaniferous ore. Thus, the acid may be recycled and used on a second titaniferous ore that may be distinct from the first titaniferous ore. Typically, one will recover and recycle acid that is in a concentration of between about 8% and about 18%. However, one prefers that the concentration be as high as possible. When the aforementioned pretreatment steps are used, the first titaniferous ore will preferably need to be leached only once, however, the recovered acid could in theory be used to perform a second leaching on the same ore.

Several minor variations exist regarding this process, including whether one will recover fines either before or after crystallization. Removal of the fine particles before crystallization may be performed according to the embodiment discussed above. However, regardless of whether the fines are recovered before crystallization, the basic concept is to crystallize and to remove the iron sulfate and other salts such as $MgSO_4$, $MnSO_4$, $VO(SO_4)$, $Zr(SO_4)_2$ and $Al_2(SO_4)_3$ from the liquid phase. The amount of the particular salts that will crystallize out will in part depend on the concentration of the corresponding elemental oxides in the original ore, as well as their leachability.

The removal of the iron sulfate and its water of hydration from the liquid phase allows for the reconcentration of the acid in the waste liquors and the recycling of the acid to the leach process. The form of iron sulfate crystallized will depend on the choice of processing conditions, but could, for example, be any of the following forms: septahydrate ($FeSO_4.7H_2O$), tetrahydrate ($FeSO_4.4H_2O$), or monohydrate ($FeSO_4.H_2O$), with copperas ($FeSO_4.7H_2O$) being the most preferred form because of its high level of water removal, crystallization kinetics, and its widespread acceptance as a water treatment chemical feedstock.

Crystallization is well known by persons skilled in the art and any form of crystallization that is now known or comes to be known and that from reading this disclosure it becomes apparent will be useful in connection with the present invention may be used. Crystallization may, for example, be performed in connection with an evaporation step. Examples of crystallization include cold crystallization and salting out with, for example, sulfuric acid or iron sulfate monohydrate, and vacuum crystallization and/or use of low temperature cooling fluids (e.g., refrigeration), which are the most preferred.

The addition of virgin or waste sulfuric acid at the crystallization step can have a significant improvement on the removal of iron sulfate from the waste liquors prior to recycle. The addition of the more concentrated acid or salts at relatively low hydration (e.g., iron sulfate monohydrate) during crystallization renders the iron sulfate less soluble and facilitates its removal.

The above process for waste treatment significantly alters the economics of an acid leach processes. By recycling acid rather than purchasing new acid, feedstock acid costs to perform the leach are significantly reduced. Similarly, waste treatment costs are significantly reduced.

The iron sulfate products that are crystallized can be recovered and further processed as necessary and used in commercial applications, such as in any applications in which it is known to use iron oxides, such as pigmentary, catalytic, magnetic, horticultural, and animal feed applications. The methods for producing an iron oxide from iron sulfate are well known to persons skilled in the art. Iron sulfate salts may also be used for water treatment.

The aforementioned leaching and recycling of leaching agents is not limited to leaching processes involving ilmenite. The waste liquors that can be generated by an acid leach process could be from other titaniferous materials such as slags, or ores such as Brazilian anatase, Peruvian anatase, Perovskite and altered ilmenites, e.g., arizonite, ilmenite-hematite ore, or leucoxene. Massive ilmenites could also be a potential feedstock. However, beach sand type ilmenites are preferred. Further, the waste stream preferably originates from a sulfuric acid leach of any type of titanium containing material that should also contain relatively high amounts of crystallizable sulfate salts, such as iron, as well as other impurities. Steel mill pickling acids that contain sulfuric acid may also be used as sulfuric acid sources.

Figure 2:
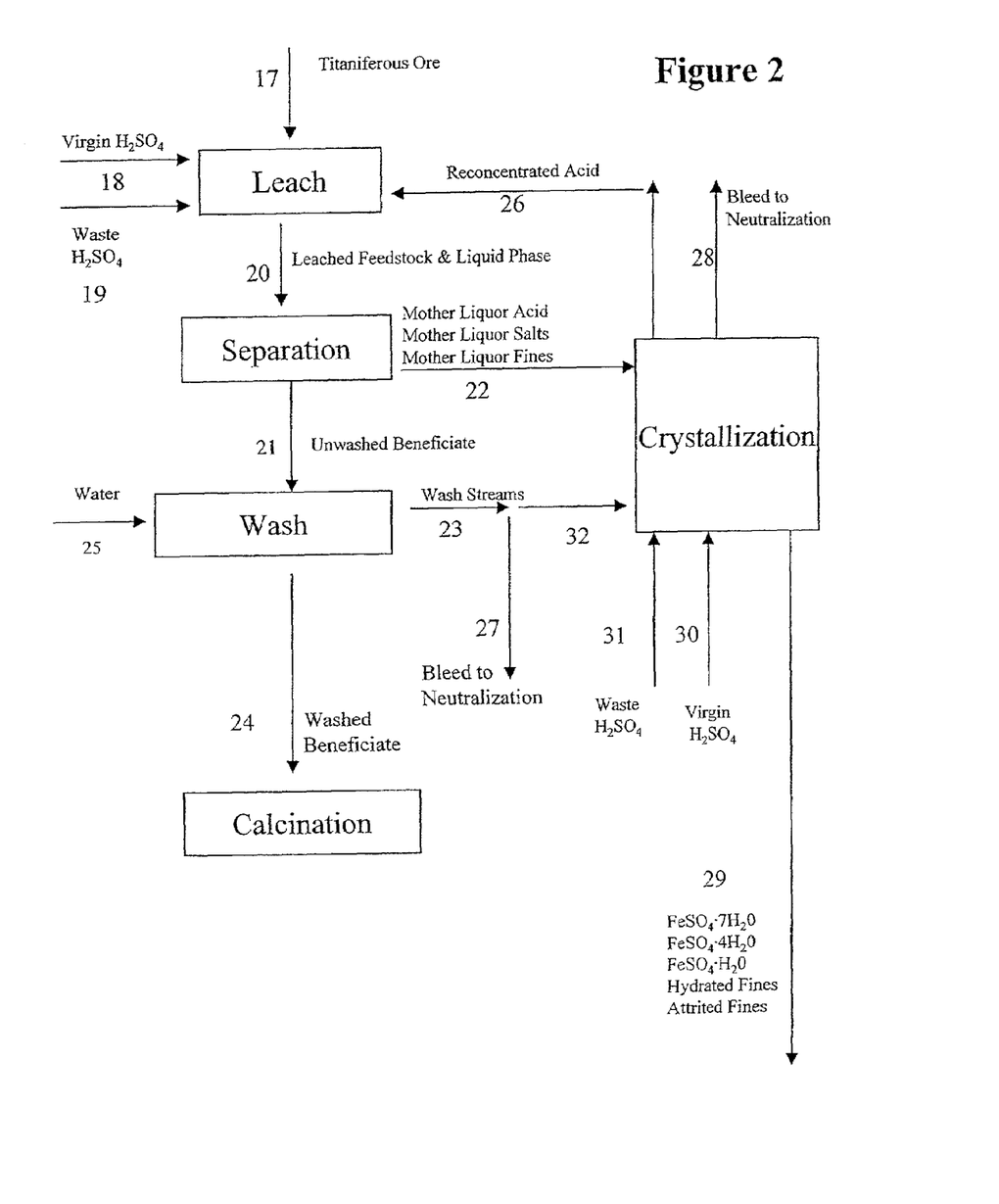
FIG. 2 is a representation of a process for the crystallization of iron sulfate and recovery of acid for recycling.

A block diagram summary of the crystallization with fines option of the invention is shown schematically in FIG. 2. As the figure depicts, a titaniferous ore that contains iron, 17, may be subject to leaching by exposing it to virgin and/or waste sulfuric acid, 18 and/or 19 respectively and produce a slurry of leached feedstock, and a liquid phase that contains acid, salts, and fines, 20. These products may be separated, generating an unwashed beneficiate, 21, and a liquid phase containing mother liquor acids, mother liquor salts and mother liquor fines, 22. The unwashed beneficiate may be subjected to a washing with, for example, water, 25, to yield a washed beneficiate, 24, and a wash stream, 23. The washed beneficiate may later be calcined, 24. The liquid phase, may be subjected to crystallization, 22. The wash stream, 23, may be bled to neutralization, 27, or subject to crystallization, 32. During crystallization, either virgin acid and/or waste sulfuric acid may be added, 30 and/or 31. As a result of crystallization, $FeSO_4.7H_2O$, $FeSO_4.4H_2O$, and $FeSO_4.H_2O$, as well as attrited and hydrated fine particles may be removed, 29, leaving reconcentrated acid to be recycled to the leaching stage, 26. Depending upon process conditions and the design of the crystallization system, there may also be a bleed to neutralization from the crystallization step, 28.

Figure 3:
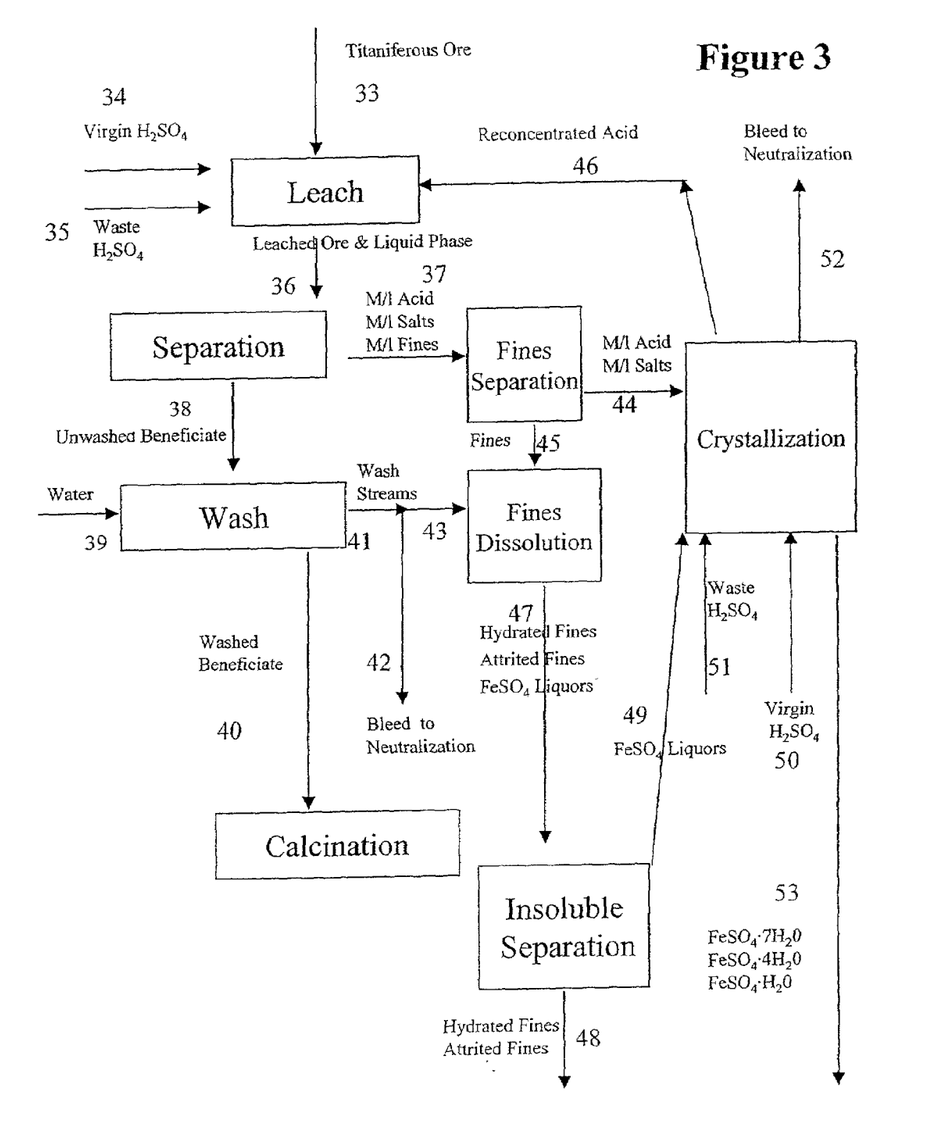
FIG. 3 is a representation of a process for acid recovery via crystallization with the separate recovery of fine titanium oxide/hydroxide particles.

The embodiments described above may be used in combination. For example, the method for recovery of titanium products from the fine particles may be used in combination with the acid recycle. Thus, there may be a recovery of the fines with acid recycle as depicted in FIG. 3. Under this embodiment, the titaniferous ore, which may be the reduced or otherwise pretreated ore, 33, is combined with virgin sulfuric acid, 34, and/or waste sulfuric acid, 35, to form a slurry containing a leached ore phase and a liquid phase containing acid, salts and fines, 36. The slurry enters a separation step such as decanting or being subject to a hydrocylcone, and yields: mother liquor acid, mother liquor salts and mother liquor fines, 37, as well as an unwashed beneficiate, 38. The unwashed beneficiate may than be washed with water, 39, to generate the washed beneficiate, which may be sent for calcination, 40, as well as wash streams, 41. The wash streams may be either bled to neutralization, 42, or fed as a solvent to fines dissolution, 43. The liquid phase (containing the mother liquor acid, salts and fines), which has been separated, 37, undergoes a fines separation process, (for example, filtration,) leaving the acid and salts to be sent to crystallization, 44, while the fines are sent for dissolution, 45.

The leach liquor, which is the liquid phase with the fines removed is sent to crystallization 44, and the acid content is subsequently recycled for a second leaching, 46. The fines are sent to a dissolving tank where dilute acid (preferably from the washings, 43) is added to dissolve the iron sulfates. The fines are subsequently put through a separation step, 47, where there is separation of the dissolved iron sulfates (preferably through flocculation or filtration), 48, from the dissolved iron sulfates, which are sent to be crystallized or neutralized, 49. The titanium fines are recovered as either hydrolysate for sulfate plant use, or catalyst use, or calcined to produce synthetic rutile fines that can be sold as low grade pigment.

Crystallization may be facilitated by the addition of virgin sulfuric acid, 50, and/or waste sulfuric acid, 51. As a result of crystallization, one generates reconcentrated acid that may be recycled, 46, waste acid that is bled to neutralization, 52, and iron sulfate products such as $FeSO_4.7H_2O$, $FeSO_4.4H_2O$, and $FeSO_4.H_2O$ products, 53, that may either be disposed of or used in commercial applications.

The choice of which fines option, for example, recovery of the fines or crystallization of them, will predominate will depend on the amount and quality of $TiO_2$ fines that are generated by a particular leach process as compared to the variable and capital costs associated with reclaiming the above $TiO_2$ fines. The desired quality of co-product iron sulfate will also be a consideration.

EXAMPLES

The following examples are set forth as preferred embodiments of the invention. These embodiments are merely illustrative and are not intended and should not be construed to limit the invention in any way.

Experimental Example #1

Oxidation/Reduction Preatment without Seed

An ilmenite feedstock of the composition shown in Table 1 was oxidized at 900° C. for 1 hour and 960° C. for an additional hour. XRD analysis performed after oxidation showed the presence of pseudobrookite with no trace of ilmenite. The oxidized ilmenite was subsequently reduced at 850° C. for 1 hour and 900° C. for an additional 1.5 hours with anthracite coal. The reduced ilmenite was then cooled under an inert atmosphere and separated from the coal char via magnetic separation. Analysis of the reduced sample showed <0.5% of metallic iron. 379.5 grams of the reduced ilmenite was placed in an autoclave and leached in a waste acid containing 1784 grams of 25% sulfuric acid and 10% $FeSO_4$ at 140° C. for 5 hours. The mixture was discharged from the autoclave at a temperature of 105° C. to 107° C. and the leach mother liquor and fines were separated by decantation from the leached ore. The recovered ore was subsequently washed and calcined at 850° C. to produce a coarse grade synthetic rutile containing 96.5% $TiO_2$ (Table 1).

The above mother liquor and fines were separated while the liquor was still hot via vacuum filtration. The wet basis weight of the leach fines was 307 grams. The fines cake was dried and ashed, and its composition determined via XRF (Table 1). The fines cake filtered relatively easily in roughly 20 minutes, as compared to experimental examples #2 and #4 below, which required several hours each. Yield results for both the coarse and fine fractions of this experiment are shown in Table 5.

Experimental Example #2

Reduction Pretreatment with Seed, No Oxidation

An ilmenite feedstock identical to that shown in Table 2 was reduced at 850° C. for 1 hour and 900° C. for an additional 1.5 hours with anthracite coal. The reduced ilmenite was then cooled under an inert atmosphere and separated from the coal char via magnetic separation. Analysis of the reduced sample showed <0.5% of metallic iron. 253 grams of the reduced ilmenite and 1.8% of Ti sulfate seed were placed in an autoclave and leached in a waste acid containing 1189 grams of 25% sulfuric acid and 10% $FeSO_4$ at 140° C. for 5 hours. The mixture was discharged from the autoclave at a temperature of 105° C. to 107° C. and the leach mother liquor and fines were separated by decantation from the leached ore. The ore was subsequently washed and calcined at 850° C. to produce a coarse grade synthetic rutile containing 89.5% $TiO_2$ (Table 2).

The above mother liquor and fines were separated via vacuum filtration. The filtration was especially difficult, requiring several hours (due most likely to a blinding of the filtration medium from the seed material in the leach). The wet basis weight of the leach fines was 116 grams. The fines cake was dried and ashed, and its composition determined via XRF (Table 2). Yield results for both the coarse and fine fractions of this experiment are shown in Table 5.

Experimental Example #3

Reduction Pretreatment without Seed, No Oxidation

An ilmenite feedstock identical to that shown in Table 3 was reduced at 850° C. for 1 hour and 900° C. for an additional 1.5 hours with anthracite coal. The reduced ilmenite was then cooled under an inert atmosphere and separated from the coal char via magnetic separation. Analysis of the reduced sample showed <0.5% of metallic iron. 232 grams of the reduced ilmenite was placed in an autoclave and leached in a waste acid containing 1089 grams of 25% sulfuric acid and 10% $FeSO_4$ at 140° C. for 5 hours. The mixture was discharged from the autoclave at a temperature of 105° C. to 107° C., and the leach mother liquor and fines were separated by decantation from the leached ore. The ore was subsequently washed and calcined at 850° C. to produce a coarse grade synthetic rutile containing 89.6% $TiO_2$ (Table 3).

The above mother liquor and fines were separated while the liquor was still hot via vacuum filtration. The wet basis weight of the leach fines was 161 grams. The fines cake was dried and ashed and its composition determined via XRF (Table 3). The fines cake filtered relatively easily compared to examples #2 and #4, though not as well as example #1 above. Yield results for both the coarse and fine fractions of this experiment are shown in Table 5.

Experimental Example #4

Oxidation/Reduction Pretreat with Seed

An ilmenite feedstock identical to that shown in Table 4 was oxidized at 900° C. for 1 hour and 960° C. for an additional hour. XRD analysis performed after oxidation showed the presence of pseudobrookite with no trace of ilmenite. The oxidized ilmenite was subsequently reduced at 850° C. for 1 hour and 900° C. for an additional 1.5 hours with anthracite coal. The reduced ilmenite was then cooled under an inert atmosphere and separated from the coal char via magnetic separation. Analysis of the reduced sample showed <0.5% of metallic iron. 253 grams of the reduced ilmenite and 1.9% of Ti sulfate seed were placed in an autoclave and leached in a waste acid containing 1189 grams of 25% sulfuric acid and 10% $FeSO_4$ at 140° C. for 5 hours. The mixture was discharged from the autoclave at a temperature of 105° C. to 107° C., and the leach mother liquor and fines were separated by decantation from the leached ore. The ore was subsequently washed and calcined at 850° C. to produce a coarse grade synthetic rutile containing 96.0% $TiO_2$ (Table 4).

The above mother liquor and fines were separated via vacuum filtration. Similar to example #2, the filtration was especially difficult, requiring several hours (due most likely to a blinding of the filtration medium from the seed material in the leach.) The wet basis weight of the leach fines was 140 grams. The fines cake was dried and ashed and its composition determined via XRF (Table 4). Yield results for both the coarse and fine fractions of this experiment are shown in Table 5.

Experimental Examples 1–4

Summary

It should be clear from the data below that the use of the oxidation/reduction pretreatment significantly improves the quality of the synthetic rutile product. Experiments #1 and #4 averaged 6.75% higher in % $TiO_2$ for the coarse fraction.

The use of the seed based leach was found to produce filtration problems that could severely impact the separation of beneficiate from mother liquor and fines, as well as separation of fines from mother liquor prior to crystallization. The loss of yield from the seed use is likely correlated to the relatively high amount of colloidal $TiO_2$ contained in the seeded batches vs. the unseeded batches. The colloidal $TiO_2$ was likely lost during the separation and washing operations. However, the difference in yield between the seeded and unseeded batches is surprising, given the long (5 hour) batch time in the leach reactor that might have allowed the colloidal $TiO_2$ to grow significantly.

The laboratory procedure for separation was intended to simulate some of the more commercially desirable types of separation, i.e., hydrocyclones, rapid settling, etc. Clearly, the use of the invention's unique combination of pretreat and sulfate leaching results in surprising improvements to downstream separations processing and reduced leach fines generation (issues that do not appear to be of as much concern with HCl leaching). These improvements greatly minimize the costs of separation equipment for scale up to commercial operations.

The improved leaching efficiency of manganese when using the preoxidation process is noteworthy. Manganese leaching efficiencies were 97.4% and 96.3% for examples #1 and #4, respectively. For examples #2 and #3, which did not use preoxidation, the leaching efficiencies were 88.8% and 90.0% respectively.

TABLE 1

Oxidation & Reduction Pretreat without Seed

| Species | Ore | Synthetic Rutile | Ashed Fines |
|---|---|---|---|
| $TiO_2$ | 57.81% | 96.50% | 29.90% |
| $Fe_2O_3$ | 27.57% | 2.02% | 67.29% |
| FeO | 10.02% | 0.00% | 0.00% |
| $SiO_2$ | 1.77% | 1.70% | 0.52% |
| $ZrO_2$ | 0.06% | 0.10% | 0.07% |
| $Al_2O_3$ | 0.91% | 0.59% | 0.20% |
| $Cr_2O_3$ | 0.07% | 0.11% | 0.12% |
| $V_2O_5$ | 0.15% | 0.25% | 0.05% |
| $Nb_2O_5$ | 0.09% | 0.21% | 0.02% |
| MnO | 1.39% | 0.07% | 1.75% |
| MgO | 0.15% | 0.01% | 0.07% |
| CaO | 0.02% | 0.01% | 0.01% |

TABLE 2

Reduction Pretreat with Seed

| Species | Ore | Synthetic Rutile | Ashed Fines |
|---|---|---|---|
| $TiO_2$ | 57.81% | 89.51% | 45.53% |
| $Fe_2O_3$ | 27.57% | 10.29% | 51.87% |
| FeO | 10.02% | 0.00% | 0.00% |
| $SiO_2$ | 1.77% | 0.94% | 0.89% |
| $ZrO_2$ | 0.06% | 0.12% | 0.07% |
| $Al_2O_3$ | 0.91% | 0.49% | 0.20% |
| $Cr_2O_3$ | 0.07% | 0.07% | 0.07% |
| $V_2O_5$ | 0.15% | 0.23% | 0.09% |
| $Nb_2O_5$ | 0.09% | 0.17% | 0.05% |
| MnO | 1.39% | 0.28% | 1.21% |
| MgO | 0.15% | 0.05% | 0.01% |
| CaO | 0.02% | 0.01% | 0.01% |

TABLE 3

Reduction Pretreat without Seed

| Species | Ore | Synthetic Rutile | Ashed Fines |
|---|---|---|---|
| $TiO_2$ | 57.81% | 89.56% | 38.30% |
| $Fe_2O_3$ | 27.57% | 9.88% | 59.15% |
| FeO | 10.02% | 0.00% | 0.00% |
| $SiO_2$ | 1.77% | 0.88% | 0.52% |
| $ZrO_2$ | 0.06% | 0.12% | 0.07% |

TABLE 3-continued

Reduction Pretreat without Seed

| Species | Ore | Synthetic Rutile | Ashed Fines |
|---|---|---|---|
| $Al_2O_3$ | 0.91% | 0.37% | 0.20% |
| $Cr_2O_3$ | 0.07% | 0.08% | 0.11% |
| $V_2O_5$ | 0.15% | 0.23% | 0.07% |
| $Nb_2O_5$ | 0.09% | 0.19% | 0.03% |
| MnO | 1.39% | 0.26% | 1.47% |
| MgO | 0.15% | 0.02% | 0.07% |
| CaO | 0.02% | 0.01% | 0.01% |

TABLE 4

Oxidation & Reduction Pretreat with Seed

| Species | Ore | Synthetic Rutile | Ashed Fines |
|---|---|---|---|
| $TiO_2$ | 57.81% | 95.99% | 35.20% |
| $Fe_2O_3$ | 27.57% | 3.18% | 60.75% |
| FeO | 10.02% | 0.00% | 0.00% |
| $SiO_2$ | 1.77% | 1.70% | 1.99% |
| $ZrO_2$ | 0.06% | 1.10% | 0.07% |
| $Al_2O_3$ | 0.91% | 0.53% | 0.18% |
| $Cr_2O_3$ | 0.07% | 0.09% | 0.10% |
| $V_2O_5$ | 0.15% | 0.24% | 0.06% |
| $Nb_2O_5$ | 0.09% | 0.19% | 0.03% |
| MnO | 1.39% | 0.10% | 1.56% |
| MgO | 0.15% | 0.01% | 0.05% |
| CaO | 0.02% | 0.02% | 0.01% |

TABLE 5

Yield Results

| Example # | Coarse Yield | Fines Yield | Total Yield |
|---|---|---|---|
| 1-Oxidation/Reduction Pretreat w/o Seed | 84.69% | 14.71% | 99.40% |
| 2-Reduction Pretreat with Seed | 84.43% | 10.97% | 95.40% |
| 3-Reduction Pretreat w/o Seed | 82.23% | 17.04% | 99.28% |
| 4-Oxidation/Reduction Pretreat with Seed | 84.40% | 11.35% | 95.75% |

Experimental Example #5

The liquid phase, comprised of mother liquor and fines from Example 1, were separated while the liquor was still hot via vacuum filtration. The wet basis weight of the leach fines was 307 grams. The fines cake was dried and ashed, and its composition determined via XRF (Table 6). The filtered mother liquor was left overnight in an open beaker at 21° C. The following day, the remaining mother liquor (797.5 grams) was decanted from the beaker and weighed as well as the copperas crystals (408 grams) that had formed overnight. Both samples were submitted for analysis. Analysis of the crystallization mother liquor was 22.7% $H_2SO_4$ and 12.2% $FeSO_4$.

From the above data, it is easy to see that with small adjustments at vacuum crystallization and with small amounts of makeup new acid that the crystallization mother liquor can be made almost identical to the original leach liquor and can be recycled to the leach step. Additionally, the fines, which contained an estimated 142 grams of ferrous sulfate and 23 grams of $H_2SO_4$, can be washed in 800 grams of water or washings to give a solution of 15% $FeSO_4$ and 2.4% $H_2SO_4$ that can be either neutralized or sent to vacuum crystallization to become part of the recycle/makeup liquors.

The above case is the "crystallization with fines recovery" option. Note that the use of the pretreatment in example #1 makes separation of fines and mother liquor easier for the fines recovery option. The simpler version of the process would involve leaving the above fines with the mother liquor and placing the hot mother liquor under vacuum. The fines would serve as seed material for the crystals as they form in the mother liquor. There would be no issues with adding water to wash the fines and no 15% $FeSO_4$ stream to send to crystallization.

The above example helps to illustrate the unique nature of the process. The water required to dissolve the $FeSO_4$ fines is essentially the required amount of water to wash the beneficiate. A plant designed according to such a process would have very little effluent other than a small bleed stream to remove the buildup of impurities and relatively little use of energy input at vacuum crystallization. (No heat was applied to evaporate the required amount of water. The heat came entirely from the leach mother liquor and the heat of crystallization of the iron sulfate. Only a vacuum was applied to concentrate and crystallize.) That the process is flexible and can be adapted to less than optimal conditions is illustrated by Example #6 below.

Experimental Example #5 demonstrates one of the more surprising aspects of the invention—the high water of hydration of copperas and the high input mother liquor temperatures from the leaching process allow the invention to reconcentrate acid cheaply and still accept most of the wash liquors from other portions of the process. This allows for relatively little effluent from a plant facility other than a bleed stream for impurities removal.

Experimental Example #6

The liquid phase or mother liquor and fines from Example #2 were separated via vacuum filtration after the liquor had been allowed to cool. (The above leach caused a blinding of the filtration medium due most likely to the seed material.) The wet basis weight of the leach fines was 116 grams. The fines cake was dried and ashed and its composition determined via XRF (Table 7). The filtered mother liquor was left overnight in an open beaker at 21° C. The following day, the remaining mother liquor (808 grams) was decanted from the beaker and weighed as well as the copperas crystals (212 grams) that had formed overnight. Both samples were submitted for analysis. Analysis of the crystallization mother liquor was 16.5% $H_2SO_4$ and 12.4% $FeSO_4$.

The above data shows the importance of evaporation to the acid recycle process and the effect of adding seed materials to the leach. (The seed solution increased water content by 225 grams.) This type of leach process would most likely be a candidate for the "crystallization with fines" option described above. Energy costs would be higher than those for example #5 above.

TABLE 6

| Species | Ore | Synthetic Rutile | Ashed Fines |
|---|---|---|---|
| $TiO_2$ | 57.81% | 96.50% | 29.90% |
| $Fe_2O_3$ | 27.57% | 2.02% | 67.29% |
| FeO | 10.02% | 0.00% | 0.00% |
| $SiO_2$ | 1.77% | 1.70% | 0.52% |

TABLE 6-continued

| Species | Ore | Synthetic Rutile | Ashed Fines |
|---|---|---|---|
| $ZrO_2$ | 0.06% | 0.10% | 0.07% |
| $Al_2O_3$ | 0.91% | 0.59% | 0.20% |
| $Cr_2O_3$ | 0.07% | 0.11% | 0.12% |
| $V_2O_5$ | 0.15% | 0.25% | 0.05% |
| $Nb_2O_5$ | 0.09% | 0.21% | 0.02% |
| MnO | 1.39% | 0.07% | 1.75% |
| MgO | 0.15% | 0.01% | 0.07% |
| CaO | 0.02% | 0.01% | 0.01% |

TABLE 7

| Species | Ore | Synthetic Rutile | Ashed Fines |
|---|---|---|---|
| $TiO_2$ | 57.81% | 89.51% | 45.53% |
| $Fe_2O_3$ | 27.57% | 10.29% | 51.87% |
| FeO | 10.02% | 0.00% | 0.00% |
| $SiO_2$ | 1.77% | 0.94% | 0.89% |
| $ZrO_2$ | 0.06% | 0.12% | 0.07% |
| $Al_2O_3$ | 0.91% | 0.49% | 0.20% |
| $Cr_2O_3$ | 0.07% | 0.07% | 0.07% |
| $V_2O_5$ | 0.15% | 0.23% | 0.09% |
| $Nb_2O_5$ | 0.09% | 0.17% | 0.05% |
| MnO | 1.39% | 0.28% | 1.21% |
| MgO | 0.15% | 0.05% | 0.01% |
| CaO | 0.02% | 0.01% | 0.01% |

What is claimed:

1. A process comprising:
   (a) leaching a pretreated titaniferous ore with sulfuric acid to form a leached ore and a liquid phase, wherein the titaniferous ore is comprised of iron and substantially all of the iron is ferrous iron, the sulfuric acid is in a concentration of from about 5 wt. % to about 50 wt. %, and the liquid phase comprises dissolved iron salts and fine particles comprising titanium hydrolysate and iron sulfate;
   (b) separating the leached ore from the liquid phase;
   (c) washing the leached ore to form a beneficiated ore; and
   (d) separating the fine particles from the liquid phase to form a mixture of fine $TiO_2$ particles and iron sulfate, re-slurrying the mixture to form dissolved iron sulfate, and separating the dissolved iron sulfate from the fine $TiO_2$ particles to form a $TiO_2$ product.

2. The process of claim 1 wherein the pretreated titaniferous ore is obtained by oxidizing and reducing a titaniferous ore.

3. The process of claim 1 wherein the titaniferous ore is ilmenite ore.

4. The process of claim 2 wherein the oxidizing occurs at a temperature of from about 800° C. to about 1150° C.

5. The process of claim 2 wherein the oxidizing of the titan iferous ore results in the formation of pseudobrookite.

6. The process of claim 2 wherein the reducing occurs at a temperature of from about 800° C. to about 1000° C.

7. The process of claim 1 wherein the iron further comprises metallic iron in an amount less than about 1%.

8. The process of claim 1 wherein the leaching occurs at a temperature of from about 110° C. to about 200° C.

9. The process of claim 1 wherein the beneficiated ore is further calcined.

10. The process of claim 1 wherein the re-slurrying is performed in the presence of acid.

11. The process of claim 1 further comprising crystallizing and removing the dissolved iron salts from the liquid phase to yield a residual acid, and recycling the residual acid to leaching step (a).

12. The process of claim 11 wherein the crystallizing and removing is accomplished by vacuum crystallization.

13. The process of claim 11 wherein the crystallizing and removing is accomplished by cooling crystallization.

14. The process of claim 11 wherein the crystallizing and removing is accomplished by adding virgin or high concentration waste acid.

15. The process of claim 11 wherein during the crystallizing and removing, iron sulfate monohyd rate or tetrahydrate is added.

16. The process of claim 11 further comprising evaporating and reconcentrating the residual acid.

* * * * *